US010529129B2

(12) United States Patent
Wong et al.

(10) Patent No.: US 10,529,129 B2
(45) Date of Patent: Jan. 7, 2020

(54) DYNAMIC SELECTION MECHANISM FOR INTERACTIVE VIDEO

(71) Applicant: HULU, LLC, Santa Monica, CA (US)

(72) Inventors: Tony Tin Fook Wong, San Francisco, CA (US); Julian Eggebrecht, San Rafael, CA (US); Chane Hollander, San Rafael, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 15/958,442

(22) Filed: Apr. 20, 2018

(65) Prior Publication Data

US 2019/0325646 A1 Oct. 24, 2019

(51) Int. Cl.
*G06T 17/20* (2006.01)
*G06T 5/00* (2006.01)
*G06T 15/80* (2011.01)

(52) U.S. Cl.
CPC .............. *G06T 17/20* (2013.01); *G06T 5/002* (2013.01); *G06T 15/80* (2013.01); *G06T 2207/10021* (2013.01)

(58) Field of Classification Search
CPC ......... G06T 17/20; G06T 5/002; G06T 15/80; G06T 2207/10021
See application file for complete search history.

(56) References Cited

U.S. PATENT DOCUMENTS

| 7,202,867 | B1* | 4/2007 | Rodriguez | G06T 15/50 |
| | | | | 345/426 |
| 2005/0081161 | A1* | 4/2005 | MacInnes | G06F 17/5004 |
| | | | | 715/765 |
| 2006/0023073 | A1* | 2/2006 | Li | H04N 7/17318 |
| | | | | 348/211.99 |
| 2011/0102679 | A1* | 5/2011 | Relan | G11B 27/034 |
| | | | | 348/584 |
| 2016/0042553 | A1* | 2/2016 | Angelidis | G06T 15/503 |
| | | | | 345/424 |

* cited by examiner

*Primary Examiner* — Sarah Lhymn
(74) *Attorney, Agent, or Firm* — Fountainhead Law Group P.C.

(57) ABSTRACT

In one embodiment, a method retrieves mask information for creating a visual effect in a three-dimensional (3D) video. The mask information includes an outline of an object. The video is stored in a first buffer. The mask information is processed in a second buffer to create a mesh that extrudes from the outline of the object. The mesh includes values that describe a shading of the mesh and the mesh being formed around the outline of the object. The method then adjusts the values of the mesh in the second buffer to minimize discontinuities in gradients created in the mesh. When a time to display the visual effect is reached in the video, the method renders the mesh from the second buffer with video from the first buffer to form the visual effect around the object to indicate that an interaction with the object is available in the video.

20 Claims, 14 Drawing Sheets

US 10,529,129 B2

DYNAMIC SELECTION MECHANISM FOR INTERACTIVE VIDEO

BACKGROUND

Using virtual reality (VR) in videos can provide an interactive video for a user. The interactive video can present to a user one or more choices that could dictate the flow of the video. The VR video can generate a visual cue that is displayed on one or more objects in the VR video. A renderer at the client can render different visual effects to present the one or more choices to the user. The user can then select one of the one or more choices. Depending on the choice, the video may proceed in different storylines.

A visual effect may be encoded in a separate video. During the VR video playback, the client may also download the information for the visual effect while downloading the VR video. The download of the additional information for the visual effect requires more bandwidth. Also, the renderer renders the VR video in addition to creating the visual effect, which requires additional computing resources.

A VR video uses more bandwidth than a traditional video because of the immersive experience provided by the VR video. Adding the presentation of the visual effect into the VR video further increases the amount of bandwidth used. When rendering the visual effect at runtime, the increase in bandwidth needed may cause problems with displaying the VR video. For example, the video may experience some jitter or rebuffering, which causes an interruption of the display of the video. Also, when the renderer renders the visual effect in addition to the VR video, the renderer may experience delays in rendering both the VR video and the visual effect.

DETAILED DESCRIPTION

Described herein are techniques for a video delivery system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments display an interactive virtual reality (VR) video that includes a visual effect. The visual effect may be a visual cue for the user so that the user can make a choice that can dictate the flow of the VR video. For example, the user can use the VR system to select one of multiple choices presented to the user, which will then cause the video to proceed down a path according to that choice. Different choices cause the video to proceed down different story lines and play different portions of video.

In some embodiments, the visual effect may be a glow (e.g., a white color to represent the glow) that a client generates dynamically at runtime while the user is watching the VR video. In some embodiments, the client generates the visual effect without using bandwidth during video playback to download information for the visual effect. For example, mask information for the visual effect may be downloaded before video playback is performed. Then, at runtime, the client generates the visual effect from the mask information and can render the visual effect with the interactive video. Accordingly, bandwidth is saved because the client does not need to download mask information for the visual effect while downloading the VR video.

Also, the client may optimize the rendering process of the visual effect. For example, the client stores and processes the mask information in a mask buffer that is separate from a screen buffer that is used to render the video. This allows the client to dynamically manipulate the mask information for rendering the visual effect without affecting the rendering of the VR video. Also, using the separate mask buffer allows the client to process the mask information to improve the display of the visual effect in the VR video as will be described in more detail below. A renderer combines the output of the mask buffer with the output of the screen buffer to display the interactive VR video with the visual effect.

System Overview

Figure 1:
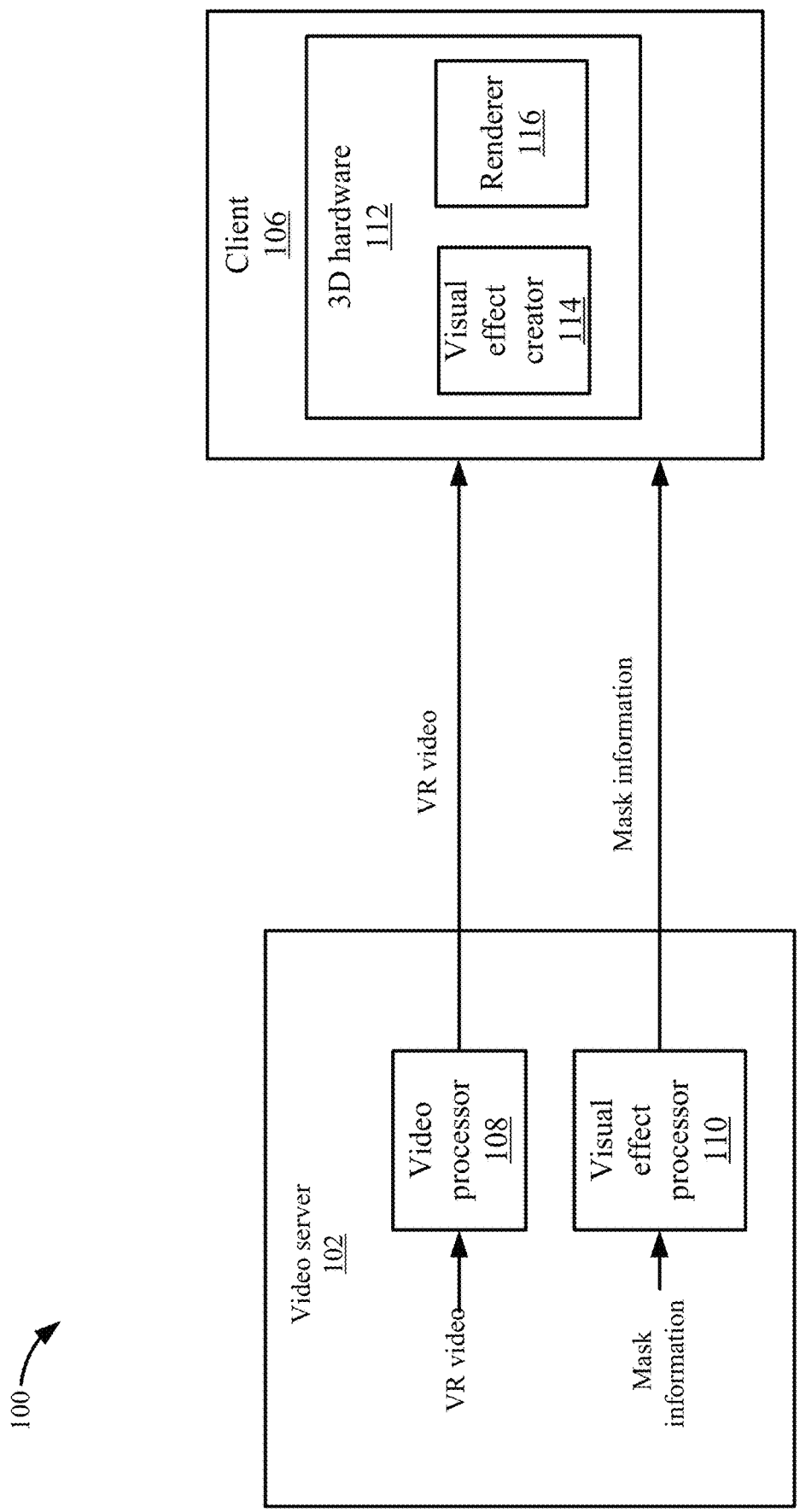
FIG. 1 depicts a simplified system for providing an interactive video with an added visual effect according to some embodiments.

FIG. 1 depicts a simplified system 100 for providing an interactive video with an added visual effect according to some embodiments. A video server 102 sends a video, such as a VR video, to a client 106. The VR video may be an interactive VR video in which a user can make choices that dictate the flow of the video. For example, if the user selects a first option in the video, then the video proceeds in a first direction that displays a first portion of video; and if a user selects a second option in the video, then the video proceeds in a second direction that displays a second portion of video different from the first portion of video. Although an interactive video is described, other types of videos may use the visual effect generation process as described. For example, a non-VR video may have a visual effect applied to the video to highlight an object for an advertisement.

A video delivery service may provide a virtual reality experience for streaming video. The video delivery service may offer a library of VR videos that users can request on-demand or stream live. A video server 102 may send the VR videos to a client 106. For example, video server 102 may be part of a content delivery network and client 106 may be different computing devices that include media players, such as a living room device, smartphone, tablet device, set-top box, television, etc.

A video processor 108 includes an encoding system (not shown) that receives spherical content in a format, such as rectangular two-dimensional (2D) images in an "equirectangular" format, from a content provider. The encoding system decodes the equirectangular data into face images for a map, such as a cube map. The face images include the content from the original spherical content. A cube map arranges the face images on a sheet that can be encoded. The cube map can then be decoded when presented to a user by placing the face images on an object, such as a cube structure. A collection of six face images making up a cube map may be much better suited to be compressed and offers low levels of distortions to the images. Then, the encoding system encodes the cube map of the video. The encoding system may be a standard encoder using one of the encoding standards. Video processor 108 can then send the compressed video stream to client 106. Although the above method of sending VR videos is described, other formats for sending 360-degree content may be appreciated, such as encoding the equirectangular image itself and streaming that to the client.

Three-dimensional (3D) hardware 112 in client 106 includes a decoder (not shown) and renderer 116. The decoder decodes the compressed video that was encoded as the cube map, and decodes the cube map into the cube format at rendering time. For example, the six face images are decoded. Then, a renderer 116 can render the face images using the cube structure. The rendered face images provide the 3D video to a user viewing the video. A user using client 106 can then view the spherical content using client 106. In one embodiment, the spherical content is presented on an application running on client 106. For example, the content is placed around a camera and the user is situated inside the cube and can view the content in 360 degrees. The user can then use a VR system (e.g., headset) to move a focus around the 360-degree content and select objects. Different portions of video are then played according to the selection.

A visual effect processor 110 can process information that allows client 106 to generate a visual effect for the VR video. For example, visual effect processor 110 receives mask information that is used to create a visual effect around an object in the VR video. Visual effect processor 110 may process the mask information into a format that renderer 116 can use to create the visual effect and then compress the mask information.

Client 106 downloads the mask information, such as before playback of the VR video starts. Then, a visual effect creator 114 processes the mask information and renderer 116 can render the visual effect in the VR video when a point in the video where the visual effect is to be applied in the VR video is reached.

Because the mask information is compressed and retrieved before playback of the VR video, bandwidth used during playback of the video to download the mask information is eliminated. Additionally, visual effect creator 114 creates the visual effect at runtime using a process that improves the display quality of the visual effect and decreases rendering time. For example, visual effect creator 114 may use a separate mask buffer that is different from a screen buffer being used to buffer the video. The use of the separate mask buffer does not affect the rendering of the VR video while the visual effect is being created. Also, using the mask buffer allows visual effect creator 114 to improve the generation of the visual effect as will be discussed in more detail below.

Visual Effect Example

Figure 2:
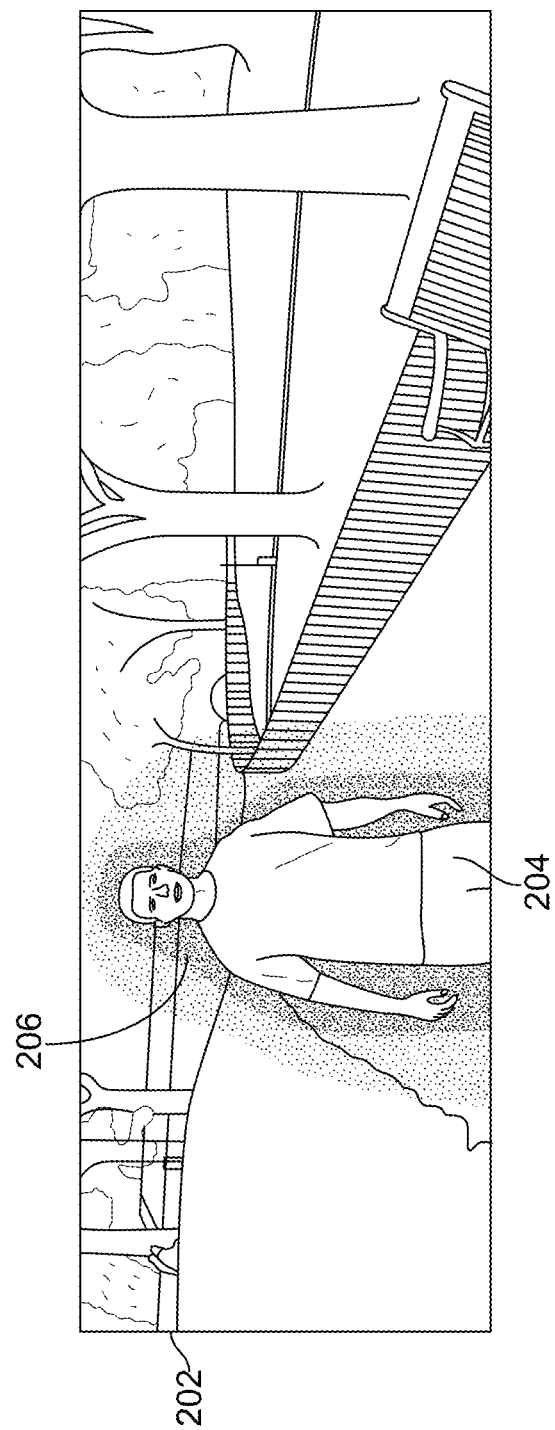
FIG. 2 depicts an example of applying a visual effect to a VR video according to some embodiments.

FIG. 2 depicts an example of applying a visual effect to a VR video according to some embodiments. An image 202 is shown from a VR video that the user is currently watching. The VR video has reached a point at which a selection is offered to the user. For example, an object 204, such as a character, may be the focus of the interaction where a user can select the character. To indicate to the user that the character may be selected, client 106 generates a visual effect 206 around the character that is shown as a glow. In FIG. 2, the glow is shown by dots around object 204. The glow may be more intense closer to the character and fade moving away from the character. The user can then focus on the character using a VR system. For example, the user may move the user's head and VR system to cause focus to be on character 204. Although only one visual effect is generated in image 202, it will be understood that multiple visual effects may be generated, such as highlighting two characters.

Visual Effect Information Generation

Figure 3:
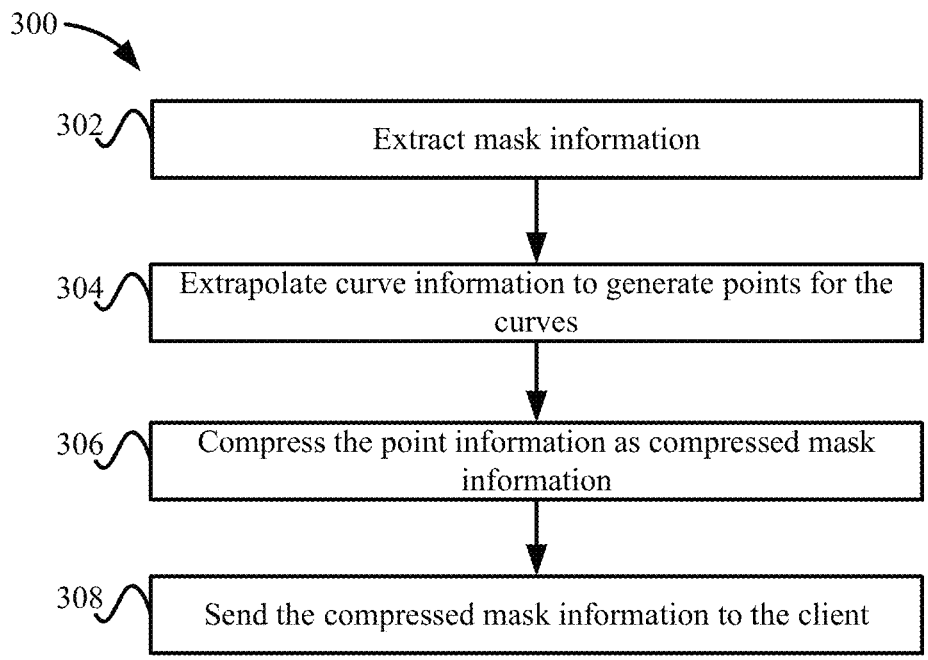
FIG. 3 depicts a simplified flowchart of a method for generating mask information according to some embodiments.

Before applying a visual effect to the video in real-time, video server 102 processes information to generate mask information. It should be understood that even though video server 102 is described as generating the mask information and sending the VR video, different entities may be performing these functions. FIG. 3 depicts a simplified flowchart 300 of a method for generating mask information according to some embodiments. The mask information may be information that can be used to generate the visual effect. For example, a mask may contain information that guides where to create the visual effect, such as the glow shown in FIG. 2 around the object.

At 302, visual effect processor 110 extracts mask information for the mask. For example, a user may have outlined the object with a tool that creates an outline for a mask, such as a line around the object. The outline is then stored as mask information. For example, equations that represent the curves of the outline are stored as the mask information. The outline of the object is used as the mask instead of outlining the glow because this decouples the visual effect of the glow from the mask information. This means that the visual appearance of the glow can be changed without requiring the mask information to be adjusted. Bandwidth is also saved by not having to send the outline of the glow because sending the outline of the object requires less data as will be described below. Similarly, content providers also save production time by not having to create a second outline for the glow.

At 304, visual effect processor 110 extrapolates the curve information to generate points for the curves. In some embodiments, visual effect processor 110 extracts Bezier curve information to generate the points for the curves. A Bezier curve may be a parametric curve that is generated from the outline. The points for the curves are points that represent the curve and may be a single position, such as a single X-Y position instead of an equation. Extracting the starting point and the midpoint of each Bezier curve is generally sufficient to recreate the curve at run time. The points are used instead of the curves because when the visual effect is generated by renderer 116, renderer 116 does not render curves but rather points in lines, and sending two points for a curve uses less bandwidth as opposed to sending the curve itself.

At 306, visual effect processor 110 compresses the point information as compressed mask information. The point information may be used because the amount of information used by the point information is less than the amount of information needed to store the glow or the curves. The less information used means less bandwidth is used to send the mask information. Although compression is described, compression does not need to be used. However, compression may lower the amount of bandwidth needed send the mask information over the network to client 106.

At 308, video server 102 sends the mask information to client 106. In some embodiments, video server 102 stores the mask information until the request from client 106 is received. For example, client 106 may receive an input to play the VR video. At that time, client 106 sends a request for the mask information to video server 102.

Visual Effect Generation

Figure 4:
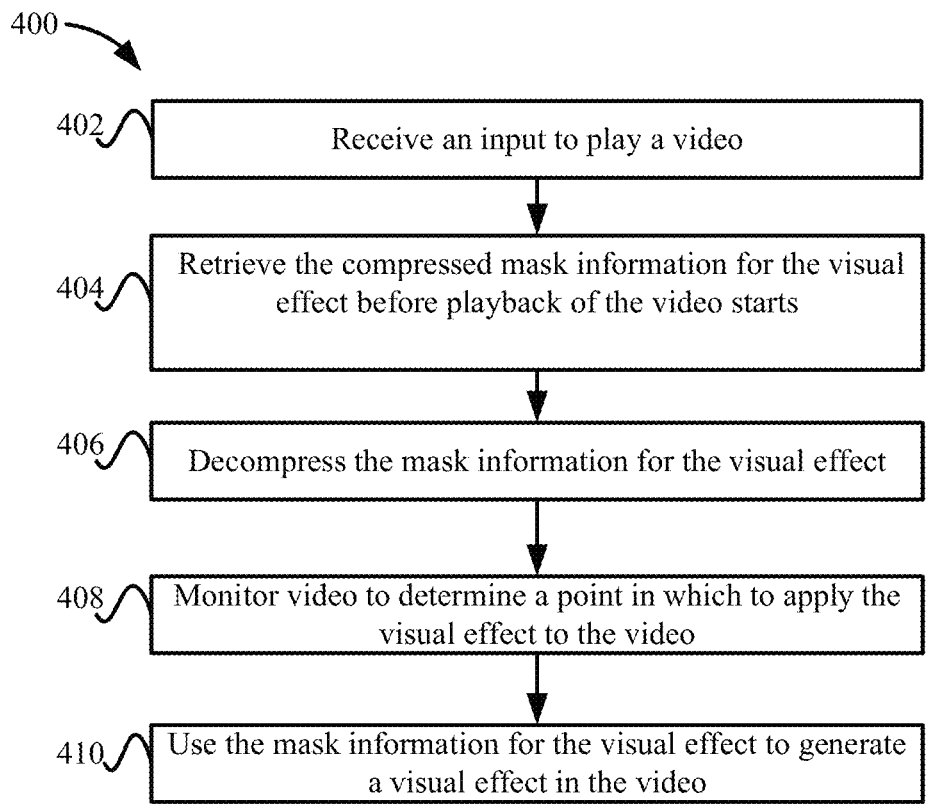
FIG. 4 depicts a simplified flowchart of a method for generating a visual effect according to some embodiments.

After receiving the mask information, client 106 generates a visual effect. The use of points for the mask information allows visual effect creator 114 to create different visual effects in the VR video. As discussed below, visual effect creator 114 creates a glow from the points. However, visual effect creator 114 may create other visual effects, such as a solid outline around the object. The use of points provides visual effect creator 114 with the flexibility to change the visual effect. FIG. 4 depicts a simplified flowchart 400 of a method for generating the visual effect according to some embodiments. At 402, client 106 receives an input to play the VR video. For example, the user may select a VR video to play on-demand or a VR video is scheduled to be played at a scheduled time.

In response, at 404, client 106 retrieves the compressed mask information for the visual effect before playback of the video starts. For example, client 106 may send a request to video server 102 for the mask information. Also, video server 102 may receive the request to play the VR video from client 106 and then automatically send the compressed mask information to client 106 in response to receiving the request to play the VR video.

At 406, visual effect creator 114 decompresses the mask information for the visual effect. After decompressing the mask information, visual effect creator 114 may process the mask information using a mask buffer that is separate from a screen buffer being used to buffer the VR video.

The mask information may be stored in the mask buffer until a time is reached where the visual effect should be applied to the VR video. At 408, client 106 monitors the video to determine a location (e.g., a time) in the video at which to apply the visual effect. For example, the VR video may reach a decision point at which the user can make a decision that will dictate the flow of the video. At 410, visual effect creator 114 uses the mask information for the visual effect to generate a visual effect in the video. For example, renderer 116 receives the processed mask information from the mask buffer and then renders the visual effect with the VR video from the screen buffer.

To apply the visual effect to the VR video, visual effect creator 114 processes the mask information to provide an improved visual effect in the 3D space. The mask information may be created in equirectangular space, and the extrusions and meshes created are in this space. Otherwise issues may arise with the mask and the video not being in the same space. For example, if the mask is created in 2D space, then the distance of a point in the mask will vary depending on how far that point is from the camera of the VR system, resulting in the mask being uneven in size. In addition, extremely large masks that wrap around the user viewing the VR video may not be able to be created as there may not be a 2D plane that can represent the 3D space that surrounds the viewer. For regular 2D video, this would not be necessary and the mask information could be created in 2D space as this matches the space of the video. The following steps of processing the mask information may not be necessary if a 2D video is being used because the 2D video may use much less bandwidth than the 3D video and thus the visual effect may be rendered in a separate video and sent with the 2D video.

Figure 5:
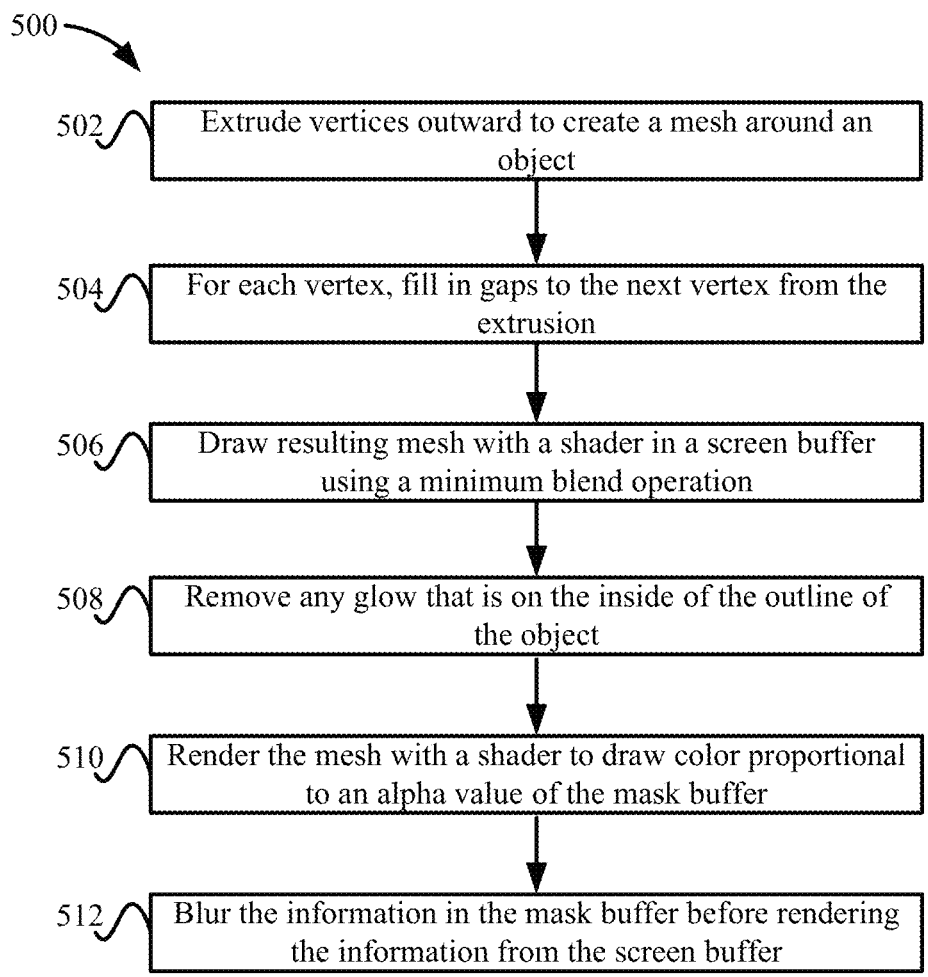
FIG. 5 depicts a simplified flowchart of a method for processing mask information according to some embodiments.
Figure 6A:
FIG. 6A shows an example of the points around the object according to some embodiments.
Figure 6B:
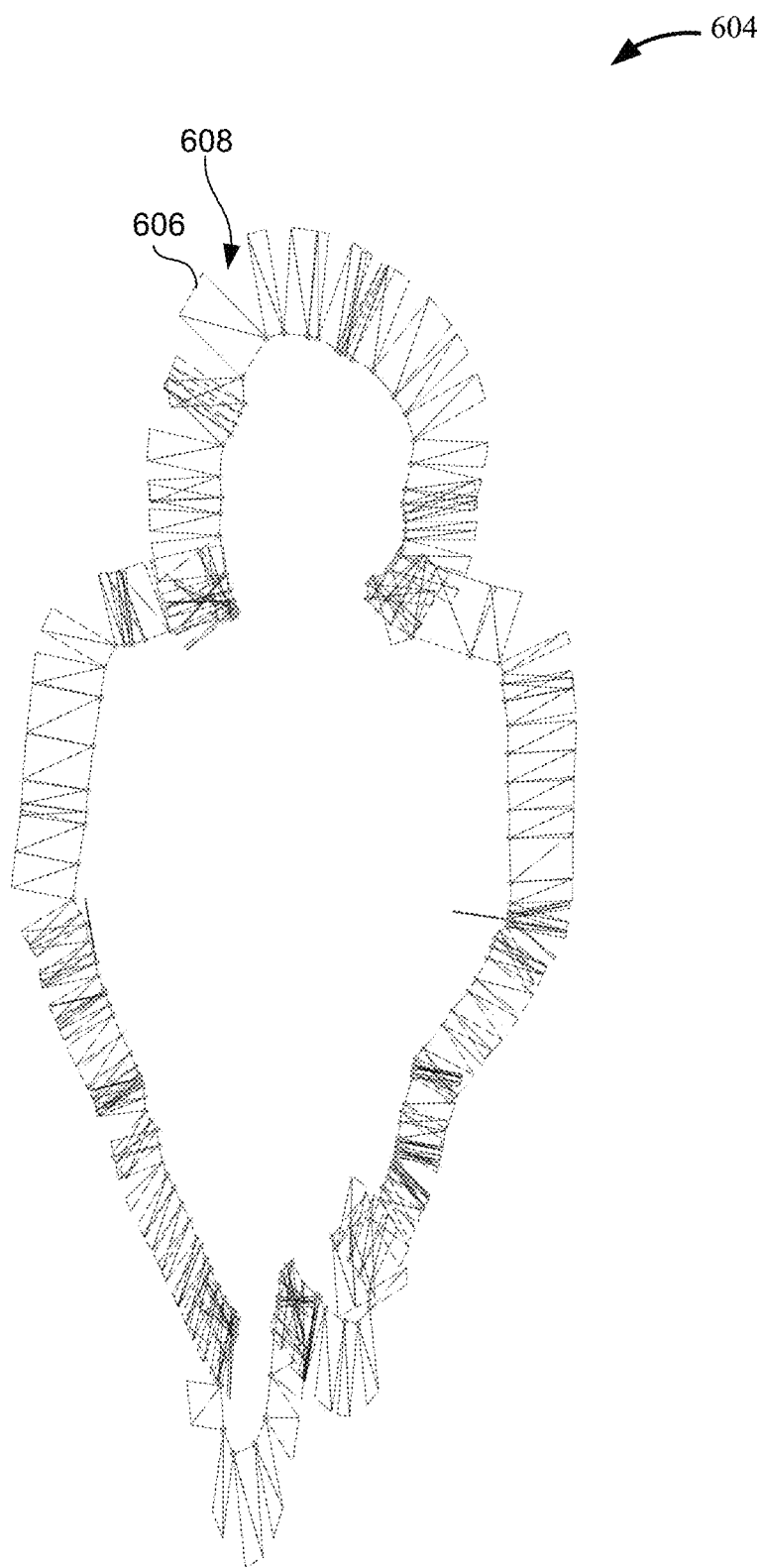
FIG. 6B shows an example of the extrusion of the vertices according to some embodiments.

FIG. 5 depicts a simplified flowchart 500 of a method for processing the mask information according to some embodiments. At 502, visual effect creator 114 extrudes vertices outward to create a mesh around an object 204, such as a character. The mask information may represent points around an outline of the object. The outer points of the outline form vertices. FIG. 6A shows an example 600 of the points around the object according to some embodiments. Multiple points 602 outline the outside of an object. Visual effect creator 114 extrudes these points outward to create the visual effect around the outside of the object. FIG. 6B shows an example 604 of the extrusion of the vertices according to some embodiments. As can be seen at 606, vertices have been extruded outward to form a mesh around the outline of the object. Visual effect creator 114 performs the extrusion by drawing a line outward from a vertex to connect with a line from another vertex. For example, extrusion of a vertex is performed by creating an up vector that is perpendicular to the vector from this vertex to the next vertex, and then applying this up vector with some multiple to the original vertex to generate area.

Figure 6C:
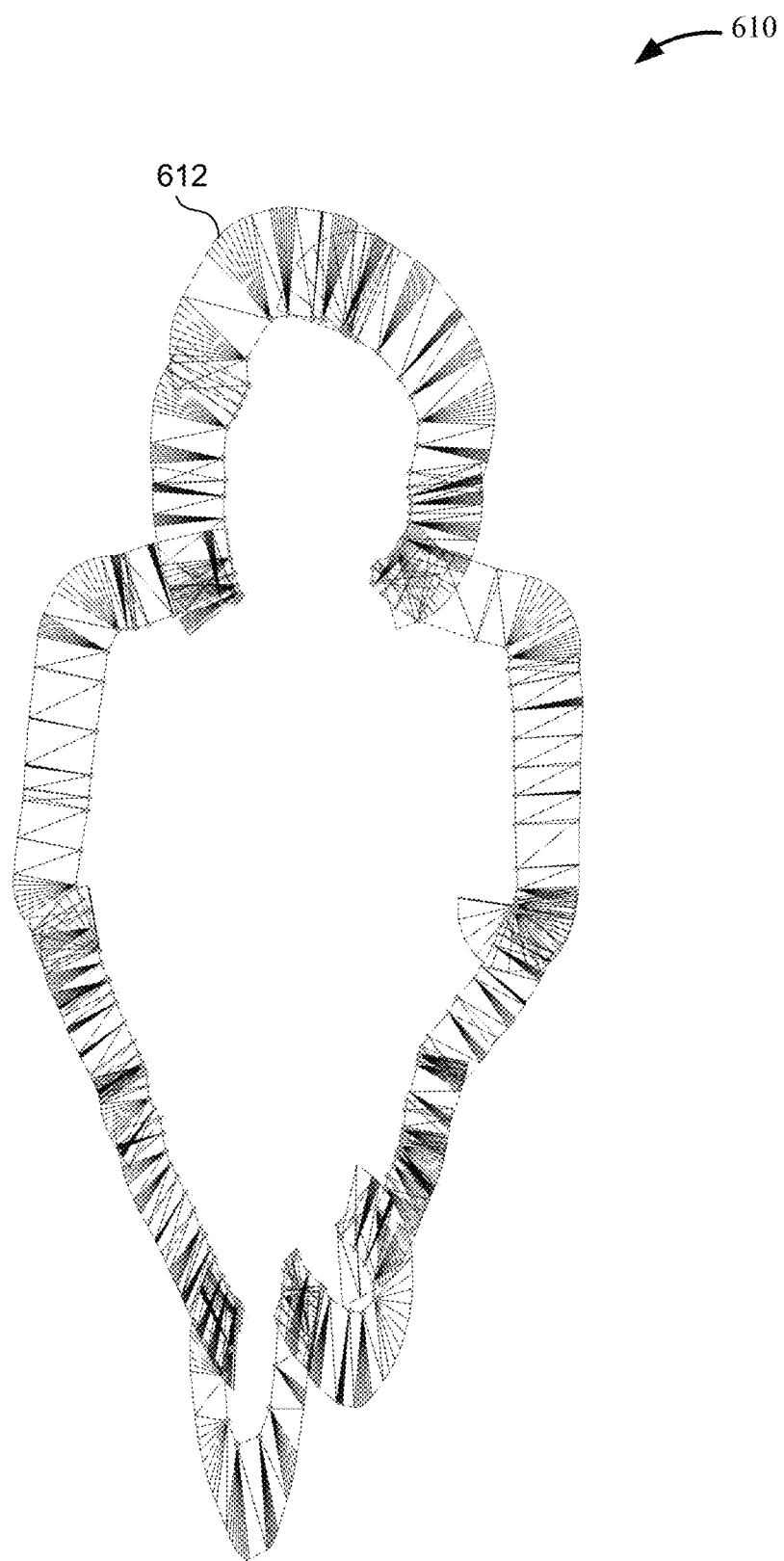
FIG. 6C shows an example of the filling in of the gaps according to some embodiments.

Referring back to FIG. 5, at 504, for each extruded vertex, visual effect creator 114 fills in gaps to the next vertex from the extrusion. For example, when extruding the vertices outward, gaps may result between the vertices. In FIG. 6B, a gap 608 is shown in between extrusions. FIG. 6C shows an example 610 of the filling in of the gaps according to some embodiments. At 612, visual effect creator 114 has filled in the gap 608 by extruding the vertex outward in different directions. The gap may be filled in by creating segments along the arc from one vertex to the next.

Figure 6D:
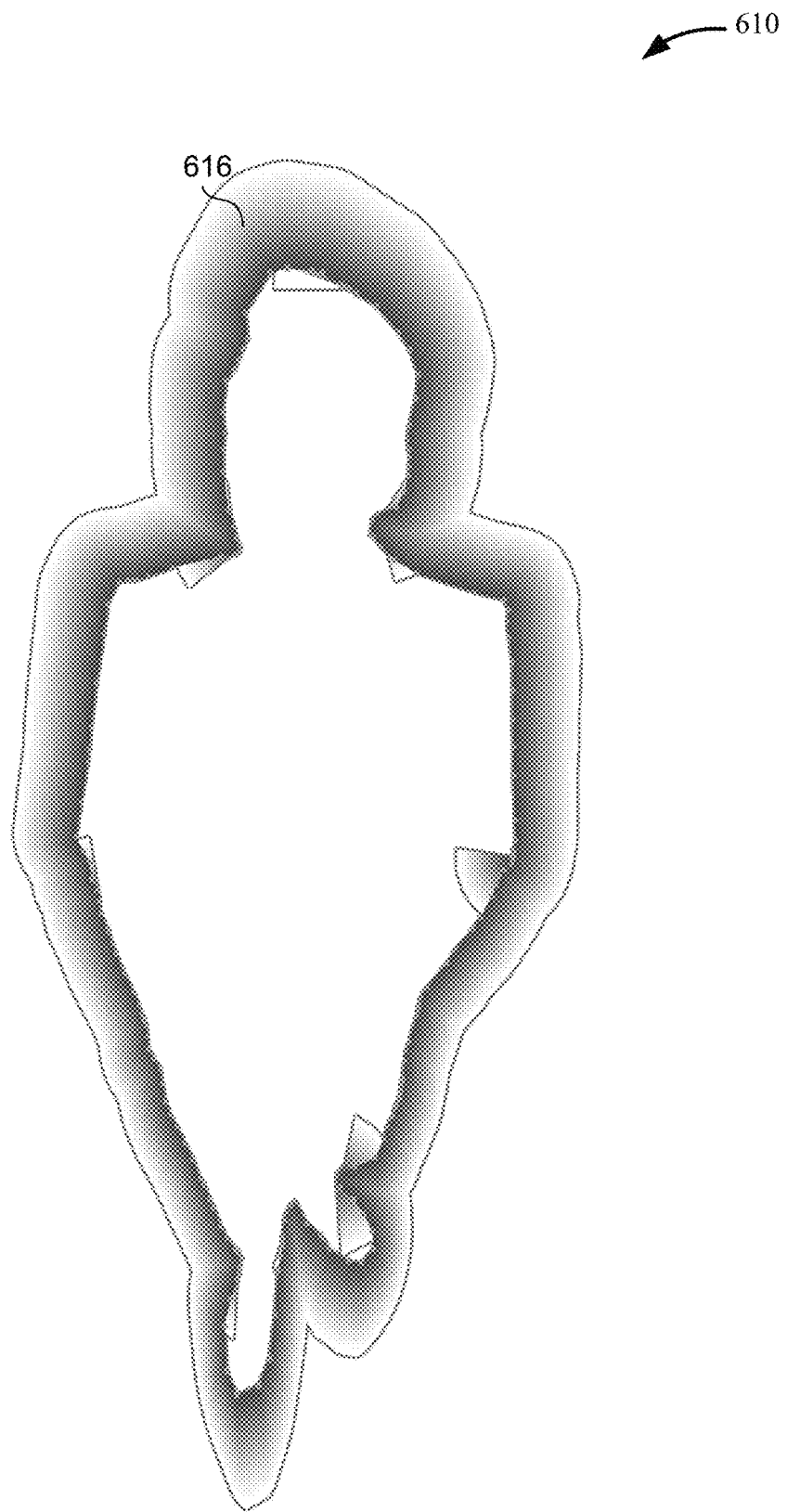
FIG. 6D shows an example of drawing the mesh according to some embodiments.

Referring back to FIG. 5, at 506, visual effect creator 114 draws a resulting mesh with a shader in a screen buffer using a blend operation, such as a minimum blend operation. The mesh may be a structure that defines the mask, such as an interlaced structure. The minimum blend operation ensures that there is not a doubling up of glow where the polygons overlap due to the extrusion. For example, if a first polygon formed from the extrusion has a first alpha value and a second polygon formed from the extrusion overlaps the first polygon has a second alpha value, visual effect creator 114 takes the lowest of the alpha values. An alpha value may represent the opaqueness of the mesh. An alpha value describes a range of values that represent the opaqueness of the glow applied; for instance, an alpha value of 255 indicates that no glow is displayed (fully opaque) and the alpha value of 0 is a full glow (no opacity). For example, drawing the mesh may accumulate alpha values in the screen buffer using the blend operation for the polygons that are encountered by the shader. The actual value stored is reversed as the initial alpha value may be 255 of no glow and then the accumulation of alpha moves the alpha value towards 0. In other examples, the alpha value of 0 may be no glow and the alpha value of 255 is full glow, and the accumulation starts from the alpha value of 0. Taking the minimum of the alpha value records the maximum amount of glow as the lower the value, the more glow is encountered. FIG. 6D shows an example 614 of drawing the mesh according to some embodiments. At 616, shading where alpha values were accumulated is shown. The fade of maximum glow near the object and minimum glow away from the object is created by rendering the mask with a texture with a grayscale gradient to represent the fade. The red lines denote the inside and outside edges of the mesh, and are merely for illustration purposes and not displayed.

Figure 6E:
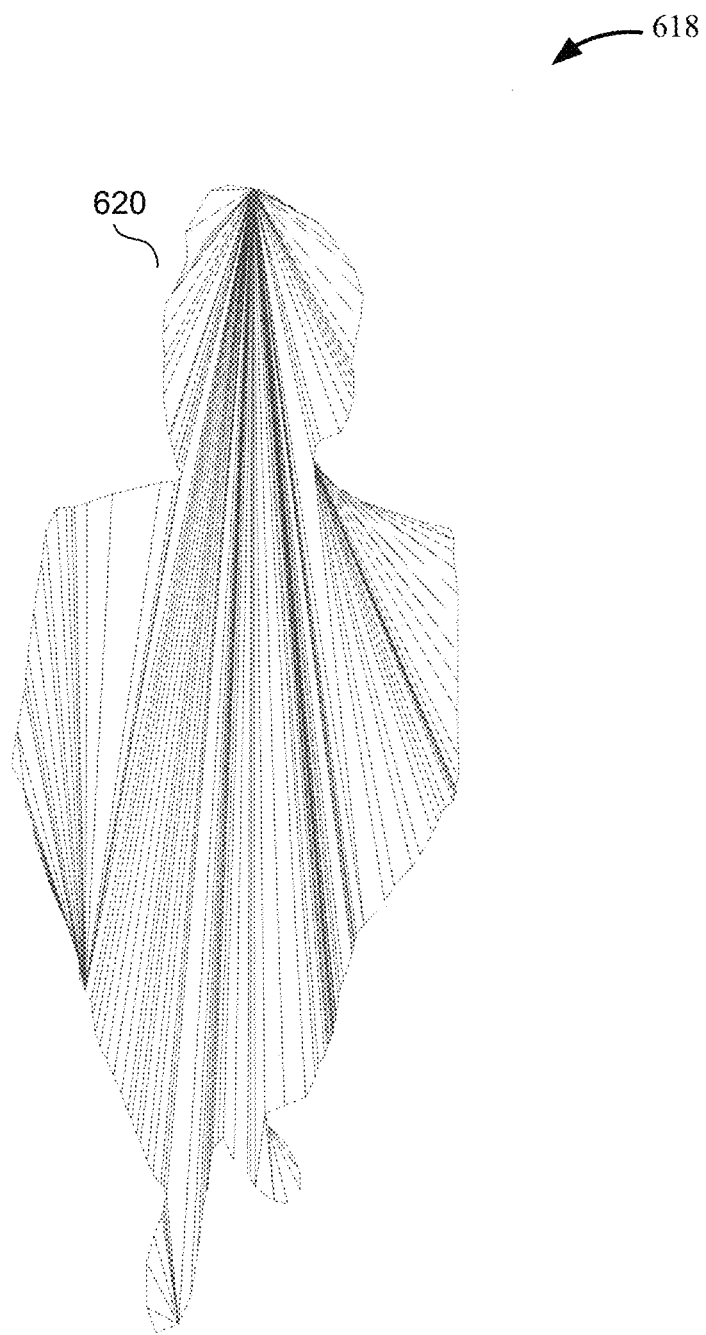
FIG. 6E depicts an example of an inner mask according to some embodiments.

At 508, visual effect processor 110 removes any glow that is on the inside of the outline of the object. Some glow inside the outline of the object may be caused by the extrusion of the vertices inwards into the object. For example, visual effect processor 110 creates an inner mask that is a triangulation of the vertices. FIG. 6E depicts an example 618 of an inner mask 620 according to some embodiments. The triangulation creates triangles between the vertices. The connecting of the vertices generates triangles that form inner mask 620, which follows the outline of the object. Inner mask 620 is rendered with an alpha value of 255. The alpha of 255 is a fully opaque rendering and will erase any glow that is encroaching on the object. This means that any glow that overlaps with the object will not be shown.

The triangulation step may be complicated when dealing with 360 VR videos. Since the points are in equirectangular space, the triangulation of those points may not produce triangles that correspond to the same area in equirectangular space when converting to 3D space for rendering. To compensate for difference, smaller triangles may be created, and hence the error between the equirectangular space and 3D space is minimized. The smaller triangles are created by denoting a number of vertices that the triangulation process should start at to ensure areas such as protruding limbs of a character are triangulated first before dealing with the main body of the character. One reason this helps is because the error in triangulation is typically due to areas around concave sections, where a large triangle will overlap the wrong area in 3D space. By removing protruding limbs, the process removes concave sections, and hence reduces the error.

Figure 6F:
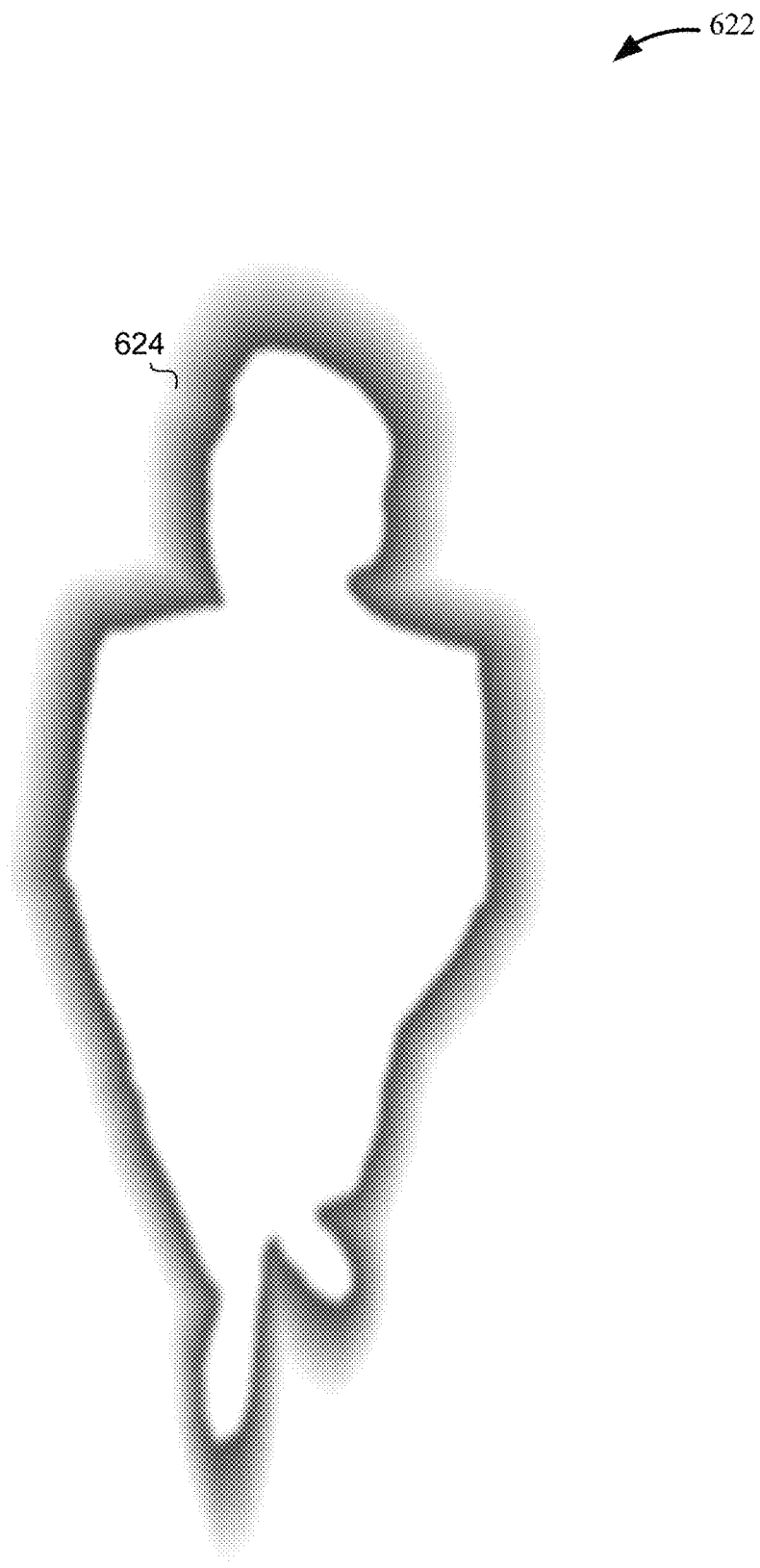
FIG. 6F shows an example of the blurring of the visual effect according to some embodiments.

The above process can create Mach bands that are discontinuities in the gradients between polygon extrusions, especially for concave vertices. The Mach band effect may be an optical illusion that exaggerates the contrast between edges of slightly different shades of gray as soon as the shades contact one another, which triggers an edge detection in a human visual system. The concave vertices may be more susceptible to showing Mach bands because the gradients between these vertices are greater. To mitigate the Mach band effect, visual effect processor 110 performs the above operations in a mask buffer that is separate from the screen buffer. Then, referring back to FIG. 5, at 510, visual effect processor 110 renders the mesh with a shader to draw color proportional to the alpha value of the mask buffer. The color may be any color, but in some embodiments, the color is a white color to represent the glow. This renders the visible mask of the glow. At 512, visual effect creator 114 can adjust the information in this buffer before rendering the information from the screen buffer to minimize the Mach bands. For example, visual effect processor 110 can blur the mesh. The blurring helps to even out the gradient discontinuities. In some embodiments, the blurring process smooths out changes in pixels, such as applying a Gaussian blur to the buffer that smooths out the deltas between alpha values of the pixels. If the mask information was being processed in the screen buffer, then the blurring cannot be used because the blurring would blur the video. Accordingly, using the screen buffer provides an advantage of reducing the Mach bands and other undesired visual characteristics, which provides a better display of the visual effect. FIG. 6F shows an example 622 of the blurring of the visual effect according to some embodiments. At 624, the glow has been blurred. The glow is now ready to be applied to the VR video. Another advantage of the blurring step is that it removes the need to apply anti-aliasing to the inside of the glow. Without the blurring, the inside of the glow may appear pixelated, especially when the size of the mask buffer is smaller than the size of the screen buffer. Although the blurring step is described, the blurring step may be skipped and the mesh may be processed in the screen buffer that is also storing the video.

If the blurring was not used, then another method may be used to remove the aliasing. The aliasing is due to the inside part of the glow appearing at full intensity while the surrounding pixels having no glow at all. The inner glow removes the aliasing by smoothing out the hard transition from the inside of the glow to the character.

Visual effect processor 110 renders an inner glow mask by extruding the inside part of the glow. The inner glow mask is an extrusion of the vertices but glowing towards the inside of the character instead of outside of the character. The inner glow is created to fix aliasing on the inside part of the glow.

Client Structure

Figure 7:
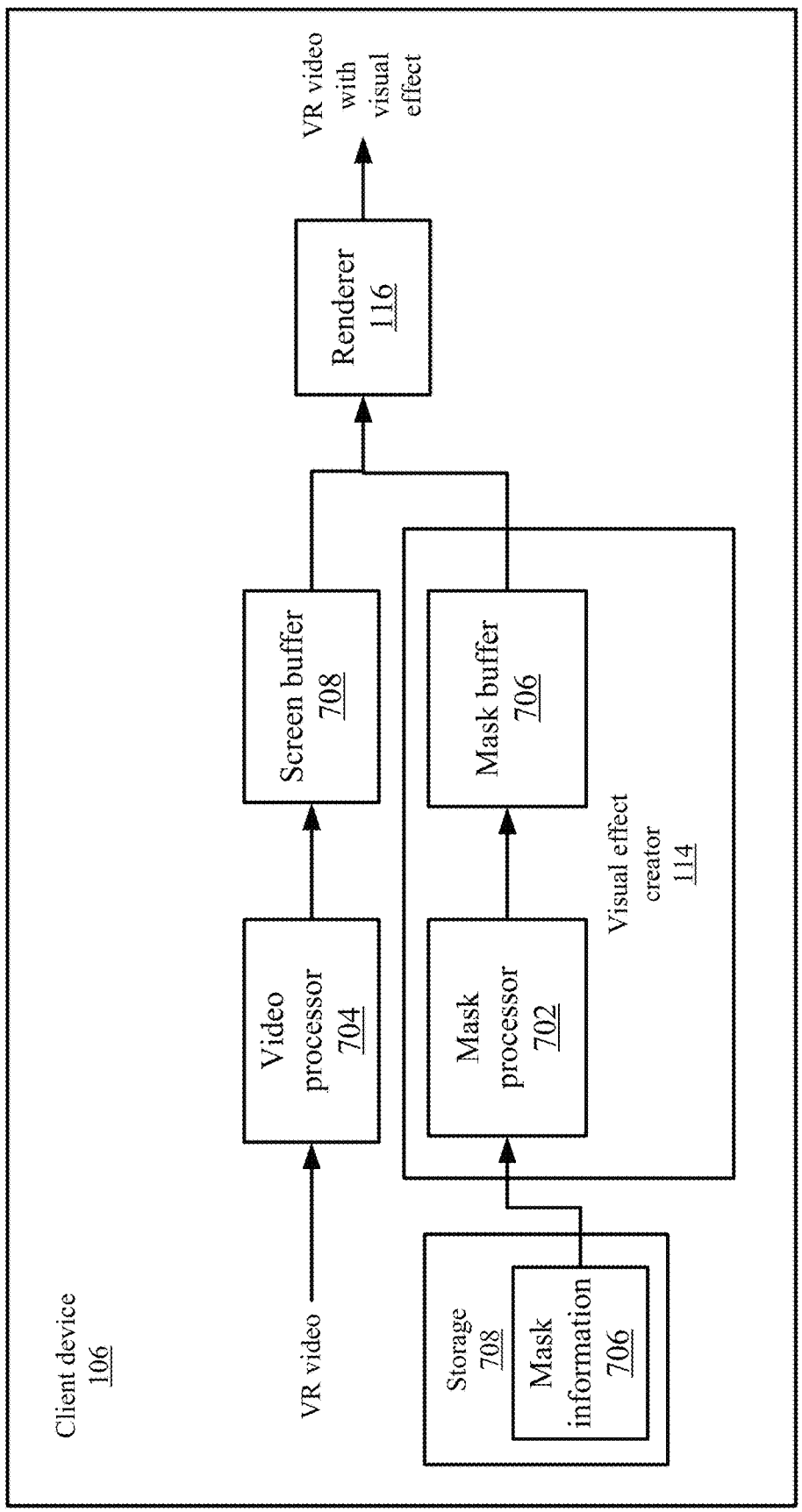
FIG. 7 depicts a more detailed example of client 106 according to some embodiments.

FIG. 7 depicts a more detailed example of client 106 according to some embodiments. Client 106 may receive the mask information and store the mask information at 706 in storage 708. Additionally, client 106 may receive the VR video at a video processor 704 that decompresses the VR video and stores the VR video in a screen buffer 708. Renderer 116 retrieves the VR video from screen buffer 708 and can render the VR video.

Meanwhile, a mask processor 702 of visual effect creator 114 processes the mask information. For example, mask processor 702 may decompress the mask information and process the mask information in mask buffer 706. Mask processor 702 may also perform the operations described in FIG. 5 on the mask information to create the visual effect. As discussed above, the mask is generated for a glow and blurred in mask buffer 706.

When a point is reached at which the visual effect is to be applied to the VR video, renderer 116 retrieves the mask information from mask buffer 706 in addition to video information from screen buffer 708. Renderer 116 can then render the VR video with the visual effect. For example, renderer 116 renders the glow around the character in the VR video.

CONCLUSION

Accordingly, some embodiments create a visual effect in a VR video that saves bandwidth. Given the bandwidth requirements for the VR video, streaming the mask information from a separate video while playing the video could cause problems with the playback. Storing the mask information prior to playback saves bandwidth. The creation of the visual effect does not use bandwidth during video playback and does not require a pause in the video playback. The selection process thus does not disrupt the playback. The visual effect is also not pre-rendered and can be manipulated at runtime to generate different visual effects. Further, some embodiments generate an improved visual effect by processing the mask information as described above in a separate mask buffer.

System

Figure 8:
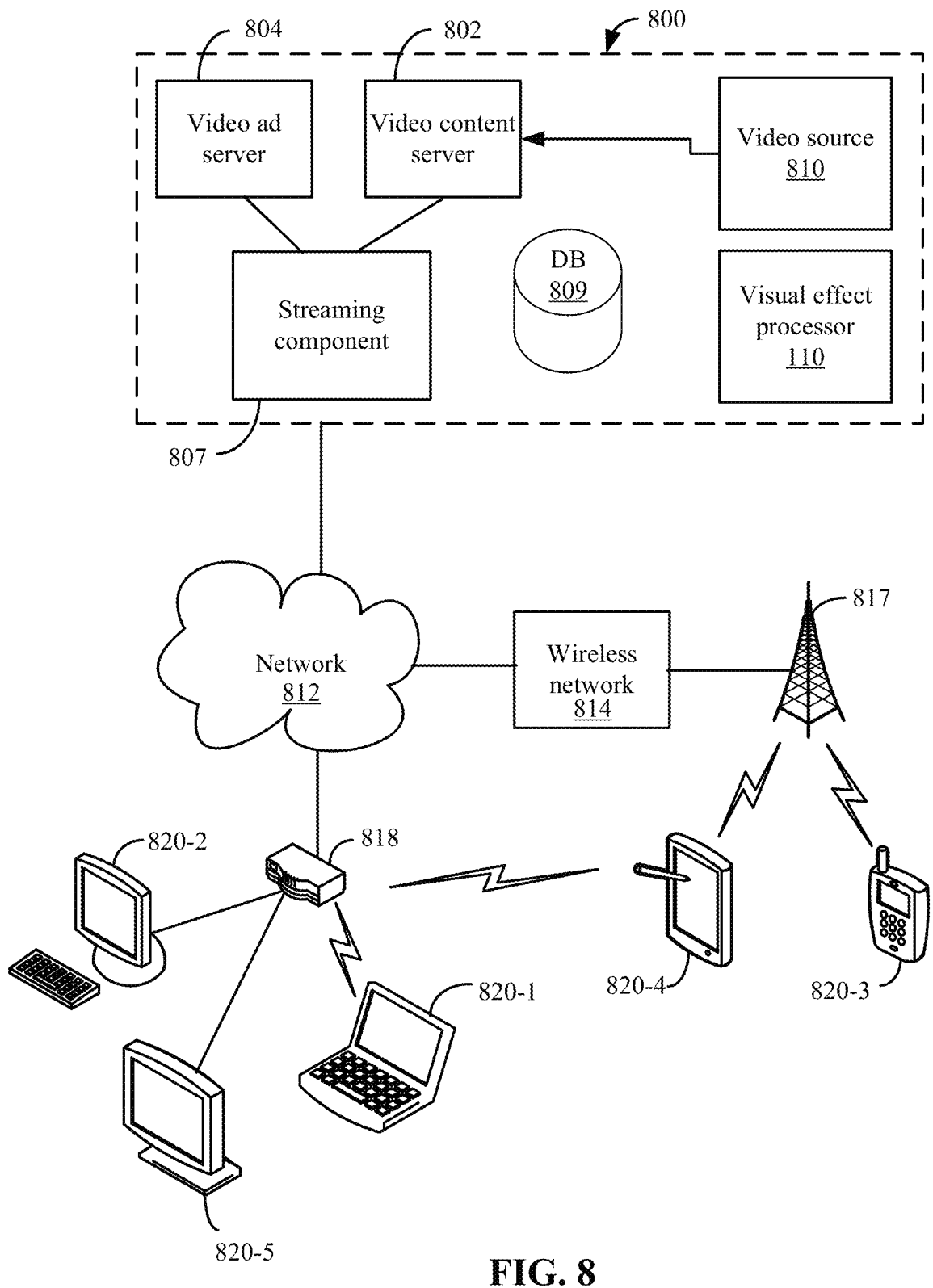
FIG. 8 depicts a video streaming system in communication with multiple clients via one or more communication networks according to one embodiment.

Features and aspects as disclosed herein may be implemented in conjunction with a video streaming system 800 in communication with multiple clients via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 also may include visual effect processor 110.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more clients 820 may be in communication with the video streaming system 800, via the data communication network 812, wireless cellular telecommunications network 814, and/or another network. Such clients may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such clients 820 may send and receive data or instructions to the system 800, in response to user input received from user input devices or other input. In response, the system 800 may serve video segments and metadata from the data store 809 responsive to selection of media programs to the clients 820. Clients 820 may output the video content from the streaming video segment in a media player using a display screen, projector, or other video output device, and receive user input for interacting with the video content.

Distribution of audio-video data may be implemented from streaming component 807 to remote clients over computer networks, telecommunications networks, and combinations of such networks, using various methods, for example streaming. In streaming, a content server streams audio-video data continuously to a media player component operating at least partly on the client, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client cannot play the video without also playing predetermined advertisements during the designated ad slots.

Figure 9:
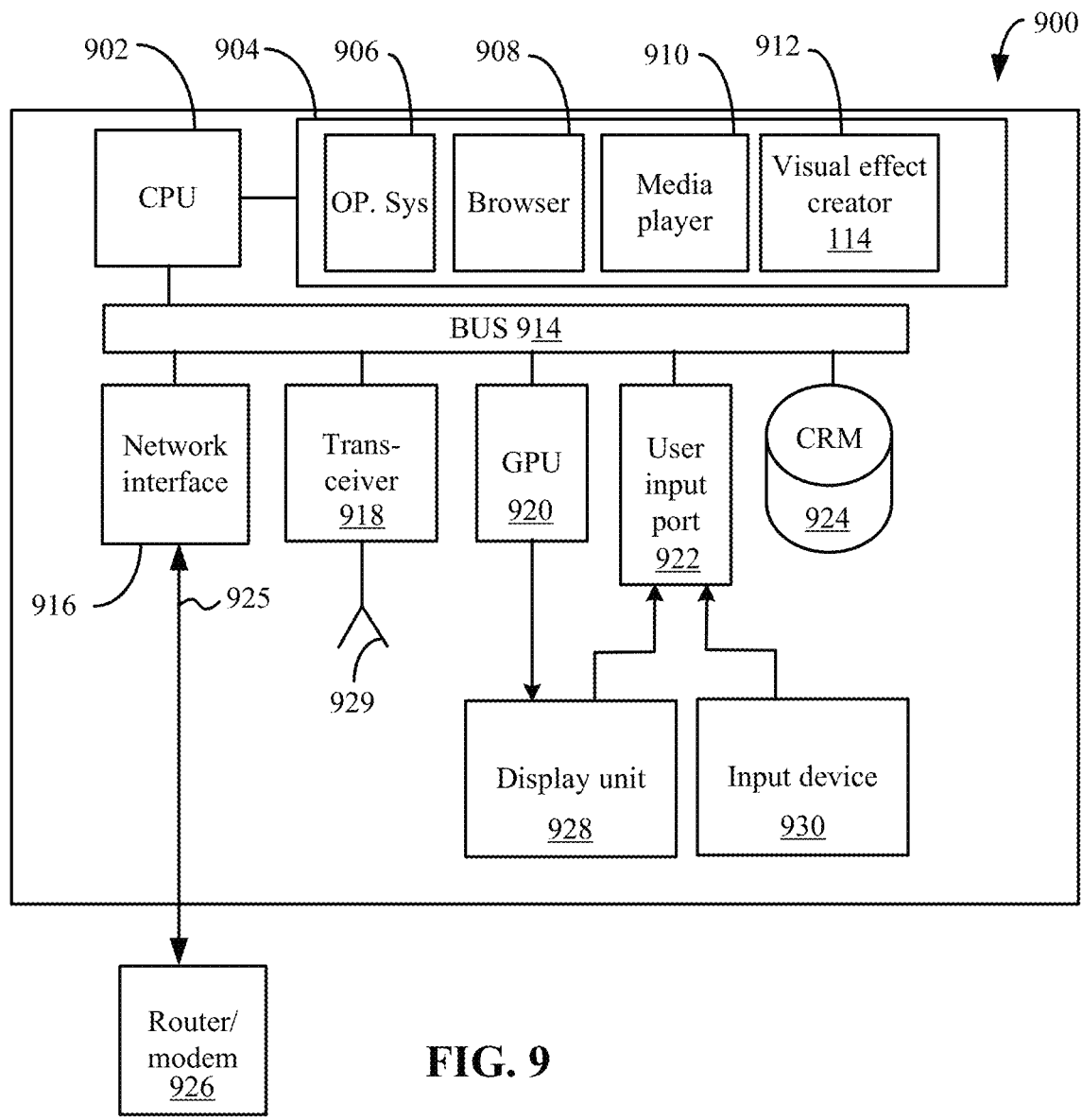
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include visual effect creator 114. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
retrieving, by a computing device, mask information for creating a visual effect in a three-dimensional (3D) video, the mask information including an outline of an object in the 3D video;
receiving, by the computing device, the 3D video from a server and storing the 3D video in a first buffer;
processing, by the computing device, the mask information in a second buffer to create a mesh that extrudes from the outline of the object, the mesh associated with a plurality of values that describe a shading of the mesh and the mesh being formed around the outline of the object;
adjusting, by the computing device, the plurality of values that describe the shading of the mesh in the second buffer to minimize discontinuities in gradients created in the mesh; and
when a time to display the visual effect is reached in the 3D video, rendering, by the computing device, the mesh from the second buffer with 3D video from the first buffer to form the visual effect around the object to represent an interaction with the object is available in the 3D video.

2. The method of claim 1, wherein processing the mask information comprises:
extruding vertices from a plurality of points that form the outline of the object outward to create the mesh around on the object.

3. The method of claim 2, wherein processing the mask information comprises:
filling in gaps that result from the extruding to form a plurality of shapes for the mesh.

4. The method of claim 3, wherein processing the mask information comprises:
drawing the mesh with a shader to accumulate an alpha value representing an opaqueness in the second buffer.

5. The method of claim 4, wherein drawing the mesh with the shader comprises:
using a blend operation to blend alpha values from the plurality of shapes that form the mesh.

6. The method of claim 5, wherein adjusting the plurality of values that describe the shading of the mesh comprises:
blurring the visual effect by minimizing the discontinuities of the gradients.

7. The method of claim 1, wherein the adjusting of the plurality of values that describe the shading of the mesh minimizes the discontinuities by smoothing deltas in alpha values of the mesh.

8. The method of claim 1, wherein the outline of the object includes a plurality of points.

9. The method of claim 8, wherein the plurality of points are created by extrapolating beginning and endpoints of curves from the outline of the object to generate the plurality of points.

10. The method of claim 1, wherein the mask information is compressed and uncompressed before storing in the second buffer.

11. The method of claim 1, wherein the visual effect comprises a glow in the mesh.

12. The method of claim 1, wherein a color proportional to an alpha value is rendered for the mesh to create the visual effect.

13. The method of claim 1, wherein the processing of the mask information is performed while the 3D video from the first buffer is received and rendered.

14. The method of claim 1, further comprising:
creating an inner mesh insides the outline of the object; and
eliminating shading of the mesh that is inside of the outline of the object using the inner mesh.

15. The method of claim 1, wherein the interaction is a selection for a user to select using a virtual reality system.

16. The method of claim 1, wherein the selection causes the 3D video to show a first portion of 3D video different from a second portion of 3D video.

17. A method comprising:
retrieving, by a computing device, mask information for creating a visual effect in a three-dimensional (3D) video, the mask information including an outline of an object in the 3D video;
receiving, by the computing device, the 3D video from a server and storing the 3D video in a first buffer;
processing, by the computing device, the mask information in a second buffer to create a mesh that extrudes from the outline of the object, the mesh associated with a plurality of values that describes a shading of the mesh and the mesh being formed around the outline of the object;
when a time to display the visual effect is reached in the 3D video, rendering, by the computing device, the mesh from the second buffer with 3D video from the first buffer to form the visual effect around the object to represent an interaction with the object is available in the 3D video;
playing, by the computing device, a first portion of 3D video when a selection of the visual effect is received by a user; and
playing, by the computing device, a second portion of 3D video when the selection of the visual effect is not received by a user.

18. The method of claim 17, further comprising:
adjusting the plurality of values that describe the shading of the mesh in the second buffer to minimize discontinuities in gradients created in the mesh.

19. The method of claim 17, wherein processing the mask information comprises:
extruding vertices from a plurality of points that form the outline of the object outward to create the mesh around on the object;
filling in gaps that result from the extruding to form a plurality of shapes for the mesh; and drawing the mesh with a shader to accumulate an alpha value representing an opaqueness in the second buffer.

20. A non-transitory computer-readable storage medium containing instructions, that when executed, control a computer system to be configured for:
retrieving mask information for creating a visual effect in a three-dimensional (3D) video, the mask information including an outline of an object in the 3D video;
receiving the 3D video from a server and storing the 3D video in a first buffer;
processing the mask information in a second buffer to create a mesh that extrudes from the outline of the object, the mesh associated with a plurality of values that describes a shading of the mesh and the mesh being formed around the outline of the object;
adjusting the plurality of values of the mesh in the second buffer to minimize discontinuities in gradients created in the mesh; and
when a time to display the visual effect is reached in the 3D video, rendering the mesh from the second buffer with 3D video from the first buffer to form the visual effect around the object to represent an interaction with the object is available in the 3D video.

* * * * *